April 6, 1926.  
B. F. LOCKE  
1,579,874  
POTATO CHIP FRYING APPARATUS  
Filed Nov. 14, 1924

Inventor  
B. F. Locke  
By C. A. Snow & Co.  
Attorneys.

Patented Apr. 6, 1926.

1,579,874

UNITED STATES PATENT OFFICE.

BENJAMIN F. LOCKE, OF LA CROSSE, WISCONSIN.

POTATO-CHIP-FRYING APPARATUS.

Application filed November 14, 1924. Serial No. 749,989.

*To all whom it may concern:*

Be it known that I, BENJAMIN F. LOCKE, a citizen of the United States, residing at La Crosse, in the county of La Crosse and State of Wisconsin, have invented a new and useful Potato-Chip-Frying Apparatus, of which the following is a specification.

This invention relates to a potato chip frying device so constructed that the chips cooked therein contain no starch and absorb no grease.

Another object of the invention is to provide a device of this character whereby comparatively large quantities of chips may be cooked uniformly throughout and after becoming crisp and thoroughly drained transferred to a suitable container.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
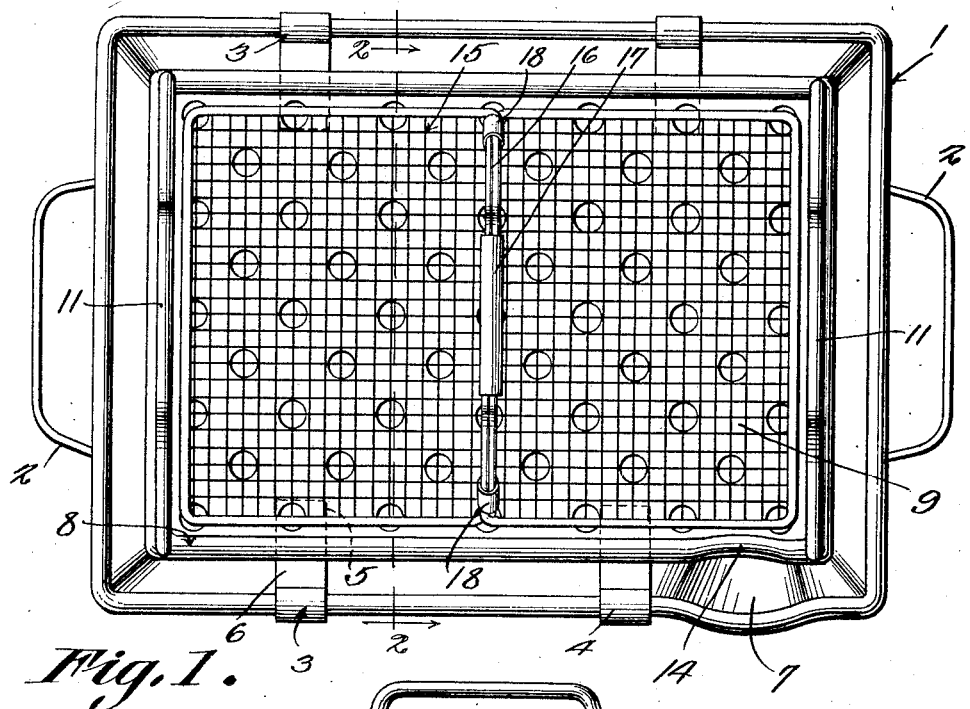
Figure 1 represents a top plan view of the device constituting this invention.

In the embodiment illustrated a comparatively deep pan 1 is shown preferably rectangular in form designed to be used as a water pan or as a frying pan, two of said pans being preferably employed and used one as a water pan and the other as a frying pan to carry out the cooking process as will be hereinafter more fully described.

This pan as shown is equipped at its opposite ends with handles 2 and with tray supporting clips 3, four of which are shown, two mounted on each side of the pan. These clips 3 are made in the form of metal strips bent at their upper ends to form hooks 4 and at their lower ends to form laterally extending tray supporting seats 5. The bodies 6 of these clips preferably lie close against the inner faces of the sides of the pan as is shown clearly in Fig. 2. The sides of the pan are preferably flared as shown in Fig. 2 and one side thereof is provided with an outward bulge 7 designed to form a seat for a thermometer to be used in testing the frying fat.

A submerging tray 8 adapted to fit loosely in the pan 1 has a perforated bottom 9 and upstanding imperforate flanges 10. Bail-shaped handles 11 rise from the opposite ends of the tray and are preferably constructed of heavy wire which is bent to form the handles and reinforcing beads 12 encased in rolled edges formed at the upper edges of the tray as is shown clearly in Fig. 2. A single piece of wire or rod is preferably used for this purpose and the end members of the tray are reinforced by smaller rods or wires 13. This tray 8 has an inwardly bent portion 14 in one side wall near one end thereof which is designed to be arranged opposite to and register with the seat 7 formed in the pan 1 and cooperate therewith to form the thermometer housing.

A tray 15 is used in connection with the submerging tray and is designed for holding the potato chips flat in this submerging tray and prevent buckling of the chips during the cooking operation. This cover or weighting tray 15 is preferably constructed of heavy mesh wire reinforced around its edges and provided with a centrally disposed upstanding bail-shaped handle 16. As shown the handle 16 and the reinforcing wire for the tray 15 are constructed from a single piece of metal wire bent to form the bead and the handle, the handle being composed of a double wire and the ends of said wire lapped at the cross bar of the handle and are covered by a protective metal sleeve-like casing 17, similar sleeves 18 being used at the lower end of the handle to hold the members thereof engaged as shown clearly in Fig. 2.

Figure 2:
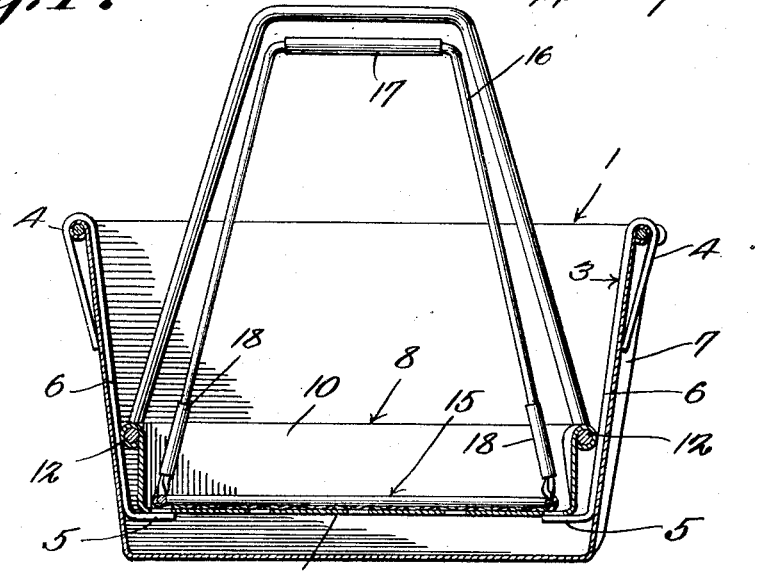
Fig. 2 is a transverse section thereof taken on the line 2—2 of Fig. 1.

In the use of this device the chip potatoes are placed in cold water preferably in one of the pans 1 and afterwards they are taken from this pan and placed in the submerging tray 8 and covered with the cover tray 15 as shown in Figs. 1 and 2 the tray 15 operating to hold the chips flat.

I claim:—

In a device of the character described, a pan, clips having hooks formed at their upper ends, said hooks adapted to overlie the upper edges of the pan, said clips having inwardly extended end portions adapted to lie in spaced relation with the bottom of the tank, a submerging tray having openings therein and adapted to rest on the inwardly extended end portions, handle portions on the submerging tray, a tray adapted to fit within the submerging tray, said last mentioned tray being constructed of wire mesh material adapted to fit into close engagement with the submerging tray, and a handle on the last mentioned tray.

In testimony that I claim the foregoing as my own, I have hereto affixed my signature.

BENJAMIN F. LOCKE.